United States Patent
Triplett et al.

(10) Patent No.: US 10,241,821 B2
(45) Date of Patent: Mar. 26, 2019

(54) INTERRUPT GENERATED RANDOM NUMBER GENERATOR STATES

(71) Applicant: INTEL CORPORATION, Santa Clara, CA (US)

(72) Inventors: Josh Triplett, Hillsboro, OR (US); Adriaan Van De Ven, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 238 days.

(21) Appl. No.: 15/368,326

(22) Filed: Dec. 2, 2016

(65) Prior Publication Data

US 2018/0157510 A1 Jun. 7, 2018

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 2009/45595* (2013.01)

(58) Field of Classification Search
CPC ............................................ G06F 2009/45587
See application file for complete search history.

(56) References Cited

U.S. PATENT DOCUMENTS

| | | | | |
|---|---|---|---|---|
| 4,590,467 A | * | 5/1986 | Lare | H04L 12/413 370/462 |
| 2004/0123185 A1 | * | 6/2004 | Pierce | G06F 11/3672 714/38.13 |
| 2010/0077394 A1 | * | 3/2010 | Wang | G06F 9/45533 718/1 |

* cited by examiner

*Primary Examiner* — Farley Abad
(74) *Attorney, Agent, or Firm* — Stoel Rives LLP

(57) ABSTRACT

The present disclosure provides RNG states. Generating the RNG states can include creating a first VM with a first RNG state and a second VM with a second RNG state and generating a plurality of interrupts for the first VM and the second VM. Generating the RNG states can also include providing the plurality of interrupts to the first VM with a first plurality of time intervals between the plurality of interrupts to configure the first RNG state and providing the plurality of interrupts to the second VM with a second plurality of time intervals, between the plurality of interrupts, that are different from the first plurality of time intervals to configure the second RNG state to be different from the first RNG state.

20 Claims, 7 Drawing Sheets

INTERRUPT GENERATED RANDOM NUMBER GENERATOR STATES

TECHNICAL FIELD

The present disclosure relates to generating random number generator (RNG) states via interrupts. In particular, the present disclosure relates to applying interrupts to two or more virtual machines (VMs) to generate different RNG states in each of the VMs.

DETAILED DESCRIPTION OF PREFERRED EMBODIMENTS

Figure 1:
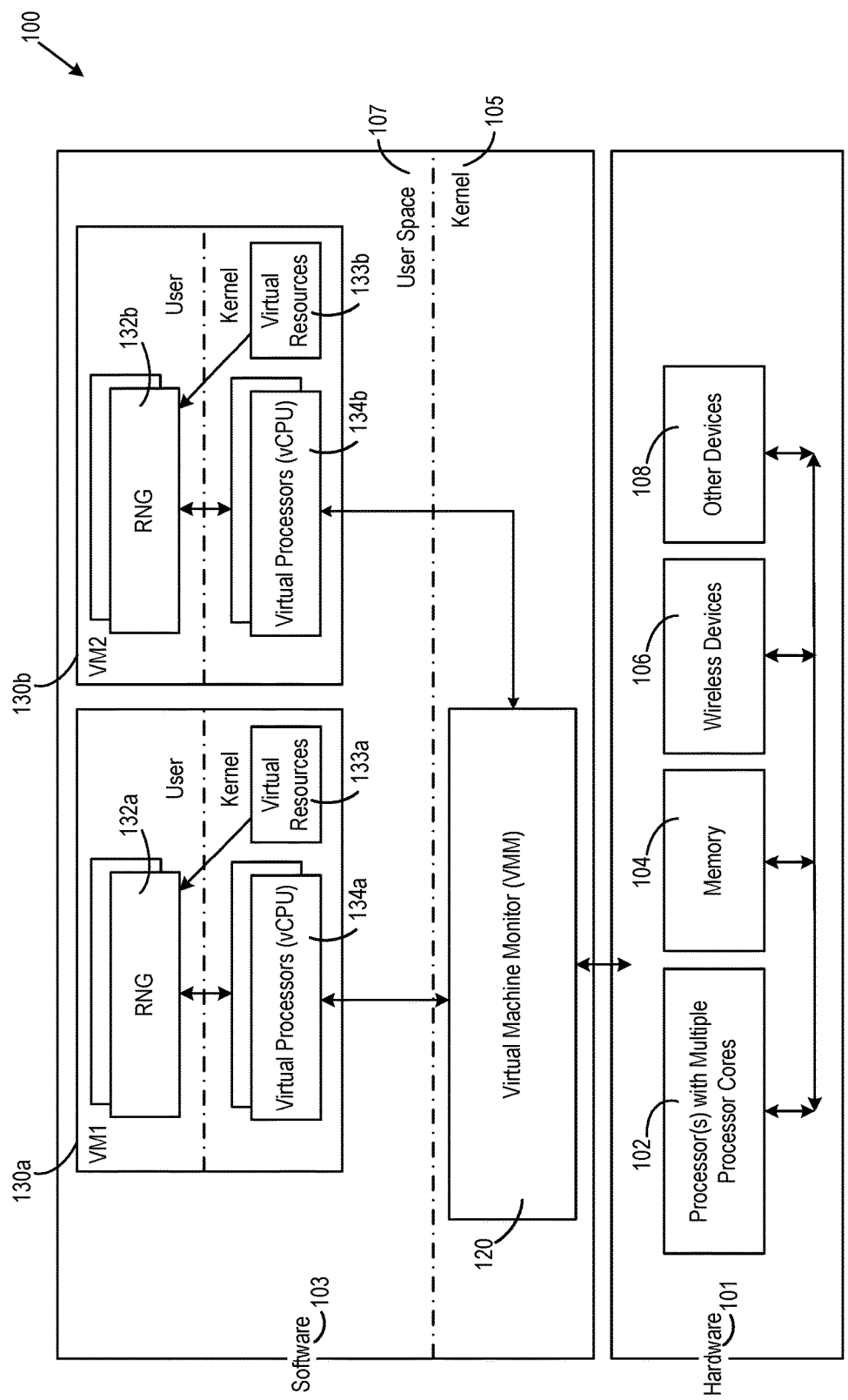
FIG. 1 illustrates a computing device having a plurality of VMs according to various embodiments.

Apparatuses, methods and storage medium associated with generating RNG states are disclosed herein. In embodiments, an apparatus for computing may include one or more processors, with each processor having one or more processor cores; one or more wireless communication components; memory coupled with the one or more processors to host a plurality of virtual machines operated by the one or more processors; and a virtual machine monitor to be loaded into the memory and operated by the one or more processors to manage operation and resource allocation to the virtual machines.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed to imply that these operations are necessarily order dependent. In particular, these operations may not be performed in the order of presentation. Operations described may be performed in an order different from that of the described embodiment. Various additional operations may be performed and/or described. Operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a computing device 100 having a plurality of VMs according to various embodiments. The computing device 100 may include hardware 101 and software 103. Software 103 may include a kernel 105 and a user space 107 (e.g., also referred to a user space 107). The kernel 105 may include a virtual machine monitor (VMM) 120 configured to manage operation and resource allocation to virtual machines (VMs) (e.g., VM1 130*a*, VM2 130*b*) operating in the user space 107.

In embodiments, the hardware 101 may include processor(s) 102, memory 104, wireless devices 106, and other devices 108. The processor(s) 102 may be any one of a number of processors known in the art having one or more processor cores. At least some of the one or more processor cores may be configured to support mapping to multiple virtual processors (vCPUs) of VMs (e.g., vCPUs 134*a* and 134*b* of the VMs 130*a* and 130*b*). Further, at least some of the one or more processor cores may be configured to operate in selected ones of less or more active states (e.g., an idle/sleep state and an active state), and/or different frequencies, consuming different amount of power while in the different states/frequencies.

The memory 104 may be any known volatile or non-volatile memory in the art suitable for storing data. The memory 104 may include a hierarchy of cache memory and system memory. Both the cache and system memory may be respectively organized into cache pages and memory pages. The wireless devices 106 may include various wireless communication or networking interfaces known, such as Wi-Fi, Cellular 3G/4G/5G, Bluetooth®, Near Field Communication, and so forth. Similarly, at least some of the wireless devices 106 may be configured to operate in selected ones of less or more inactive states (e.g., an idle/sleep state) and an active state (consuming different amount of power while in the different states). The other devices 108 may include wired communication or networking interfaces, such as Ethernet, Universal Serial Bus (USB), and so forth; storage devices, such as solid state, magnetic and/or optical drives; input devices, such as keyboard, mouse, touch sensitive screen, and so forth; and output devices, such as display devices, printers, and so forth. Likewise, at least some of the other devices 108 may be configured to operate in selected ones of less or more inactive states (e.g., an idle/sleep state) and an active state (consuming different amount of power while in the different states). In embodiments, the various hardware components, in particular, the wireless devices 106, may have corresponding drivers (not shown) in the kernel 105.

As described earlier, each of the VMs 130a and 130b may include a number of the vCPUs 134a and 134b that are virtualization of the processor cores of the processor 102, in a respective kernel, and RNGs 132a and 132b operated by the vCPUs 134a and 134b in a respective user space. The RNGs 132a and 132b may be applications used to generate random numbers of components of an operator used to generate random numbers. Each of the VMs 130a and 130b may further include a guest operating system (OS) (not shown) in its kernel. The guest OS may likewise be any one of a number of OS known in the art (e.g., the Windows OS from Microsoft® Corporation or Linux OS). Further, each guest OS may include a VM performance/resource monitor configured to monitor performance and resource utilization metrics of the corresponding VMs 130a and 130b, such as, but not limited to, vCPU utilization, memory accesses, networking bandwidth consumption, and so forth. While for ease of understanding only two VMs 130a and 130b are shown in FIG. 1, the present disclosure is not limited. The computing device 100 may have any number of VMs, subject only to the performance requirements and resources available.

The VMM 120 of the kernel 105 may be configured to manage operation and resource allocation to the various VMs 130a and 130b (e.g., instantiation/spawning and consolidation of the VMs 130a and 130b), mapping of processor cores of the processor 102 to the vCPUs 134a and 134b of the VMs 130a and 130b, mapping of virtual addresses of the VMs 130a and 130b to the physical addresses of the memory 104, and so forth, and monitor operations of the VMs 130a and 130b. The VMM 120 may be any one of a number of VMMs known.

The RNGs 132a and 132b can generate random numbers. The RNGs 132a and 132b can generate random numbers based on the state of the RNGs 132a and 132b. The RNG states can be based on the state of the VMs 130a and 130b. For example, the RNG 132a can have an associated state based on the state of the VM 130a. The RNG 132b can have an associated state based on the state of the VM 130b.

The state of the VMs 130a and 130b can change as virtual resources 133a and 133b change. The virtual resources 133a and 133b can include, for example, memory, wireless devices, and/or other devices. The virtual resources 133a and 133b can generate interrupts to perform a number of operations which can change the state of the VMs 130a and 130b and the RNGs 132a and 132b.

The interrupts can differ as they are applied to the VMs 130a and 130b. For example, the time intervals between interrupts can differ as applied to the VMs 130a and 130b. The quantity of interrupts applied to the VMs 130a and 130b can differ. The types of interrupts applied to the VMs 130a and 130b can differ.

In some examples, the VM 130a can be created before the VM 130b. The VM 130b can be generated from the VM 130a. That is, the VM 130b can be a copy of the VM 130a (e.g., the VM 130b can be forked from the VM 130a). At the time of the creation of the VM 130b, the VMs 130a and 130b can have a same RNG state of the RNGs 132a and 132b.

In different examples, the VMs 130a and 130b can be copies of a different VM (not shown). That is, the VMs 130a and 130b can be forked from a different VM. As such, the VMs 130a and 130b can have a same RNG state as the different VM.

The VMs 130a and 130b can be forked to duplicate a next logical flow of the VMs 130a and 130b. For example, if the VM 130a is executing an application that generates an error exception based on a bug associated with the application, then the VMM 120 can be used to generate the VM 130b at a point in time before the error is generated in the VM 130a. The VMs 130a and 130b can then be used to explore different logical paths that may lead to a discovery of where the exception originates.

The RNG states may be changed to ensure security-sensitive applications such as transmission control protocol (TCP) sequence numbers and/or cryptographic key generation. Without separate RNG states, the RNGs 132a and 132b would generate a same random number. Generating a same random number can be a problem, for example, if sensitive data is protected using random numbers that are the same. For example, if the RNGs 132a and 132b generate a same random number, then the VMs 130a and 130b would use the same random number to generate a same cryptographic key for different secure socket layer (SSL) sessions. The cryptographic key can include a secret based on the same random number.

The interrupts can be generated by the hardware 101 and provided to the VMM 120. The interrupts can be received by the VMM 120 and provided to the virtual resources 133a and 133b. The virtual resources 133a and 133b can receive the interrupts and provide the interrupts to the VMs 130a and 130b. The VMs 130a and 130b can receive the interrupts and provide the interrupts to the vCPUs 134a and 134b.

The interrupts can consist of newly generated interrupts and/or of expected interrupts. As used herein, the newly generated interrupts comprise interrupts that are generated for the sole purpose of generating a new RNG state. For example, newly generated interrupts can include interrupts that are generated by the VMM 120 and provided to the virtual resources 133a and 133b. The newly generated interrupts can be created with the expectation that the VMs 130a and 130b receiving the newly generated interrupts will ignore the interrupts. For example, the newly generated interrupts can be a network traffic interrupt where the network traffic is for a VM that is not one of the VMs 130a and 130b. The newly generated interrupts can then be provided to the VMs 130a and 130b. Upon receiving the interrupts, the VMs 130a and 130b can review the header information on the network traffic and determine that the network traffic is not intended for the VMs 130a and 130b and ignore the network interrupts and/or the network traffic.

Expected interrupts are interrupts that are generated to service the VMs 130a and 130b. If the VMs 130a and 130b request data from a virtual storage device, then the virtual storage device can generate the interrupt to signal to the VMs 130a and 130b that the requested data is available. The interrupt can be expected if the VMs, the OS executing in the VMs, and/or the applications executing in the VMs and/or OS requested resources associated with the interrupt and/or if the interrupt was generated to service the VMs.

Figure 2:
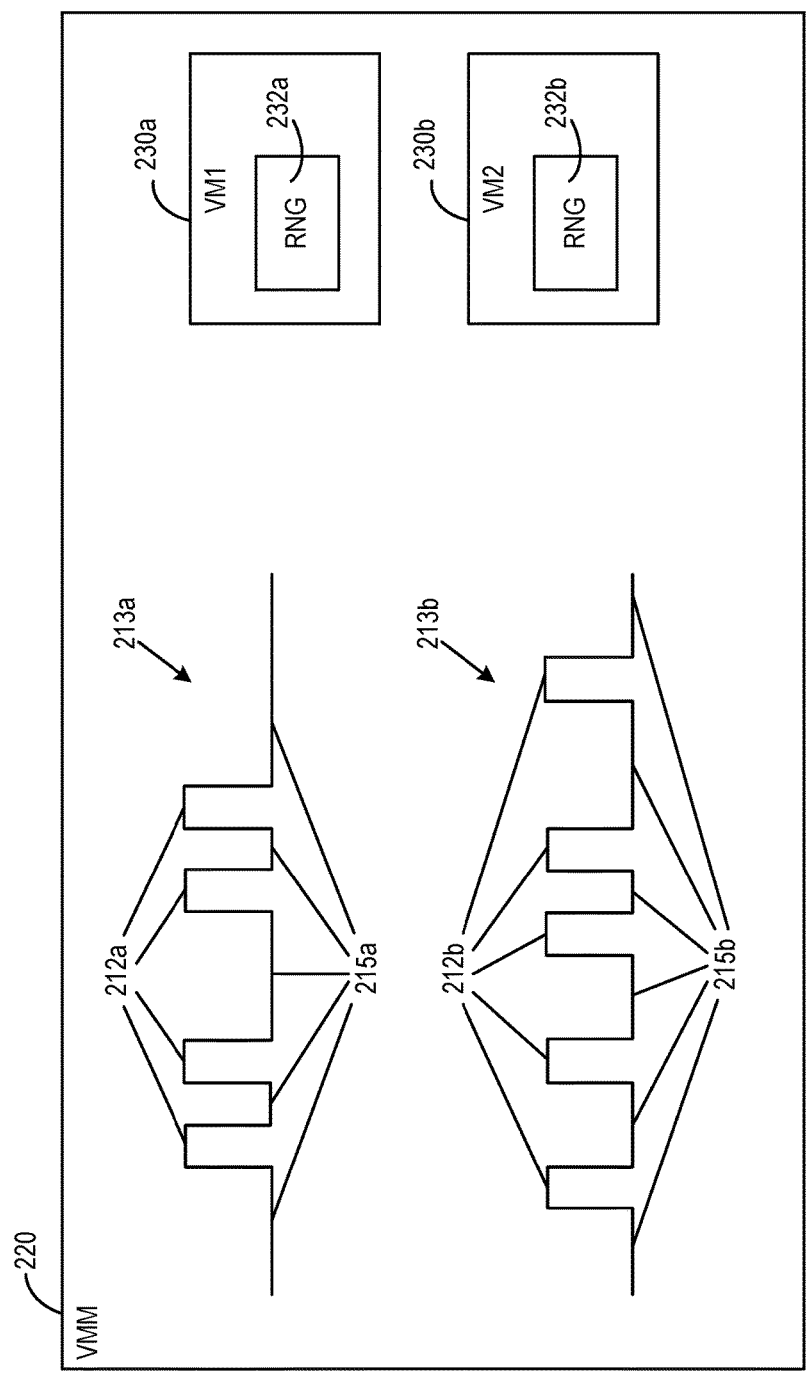
FIG. 2 illustrates timing diagrams for a plurality of interrupts according to various embodiments.

FIG. 2 illustrates timing diagrams 213a and 213b for a plurality of interrupts according to various embodiments. FIG. 2 illustrates a VMM 220 and VMs 230a and 230b. The VM 230a (e.g., VM1) can include RNG 232a and the VM (e.g., VM2) 230b can include RNG 232b.

The timing diagrams 213a and 213b can include a plurality of interrupts 212a and 212b. The timing diagram 213a includes the interrupts 212a and the timing diagram 213b includes the interrupts 212b. The timing diagrams 213a and 213b can also include a plurality of time intervals 215a and 215b. The timing diagram 213a includes the time intervals 215a and the timing diagram 213b includes the time intervals 215b. The timing intervals 215a and 215b can include intervals of time between the interrupts 212a and 212b.

In some examples, the quantity of the interrupts 212a can differ from the quantity of the interrupts 212b. For example, the interrupts 212a can include a quantity of interrupts that is greater or smaller than the quantity of the interrupts 212b.

The interrupts 212a can include interrupts with a first type while the interrupts 212b can include interrupts with a second type. For example, the interrupts 212a can be limited to a type of interrupts while the interrupts 212b are limited to a second type of interrupts. In some embodiments, the type of interrupts can be different in corresponding interrupts from the interrupts 212a and 212b. For example, a first interrupt of the interrupts 212a can be a first type of interrupt and the first interrupt of the interrupts 212b can be a second type of interrupt where the first type of interrupt and the second type of interrupt are different. The types of interrupts can describe an origin of an interrupt and/or a purpose of an interrupt. For example, a type of interrupt can include a network interrupt, a storage device interrupt, and/or a context switch interrupt, among other types of interrupts.

In some examples, the time intervals 215a and 215b can differ. For example, the quantity of the time intervals 215a can be different from the quantity of the time intervals 215b. The duration of the time intervals 215a can be different from the duration of the time intervals 215b. For example, a first time interval from the time intervals 215a can be different from the first time interval from the time intervals 215b. A pattern associated with the time intervals 215a and 215b can be different. A pattern can consist of a repetition of a quantity of time intervals and a duration of the time intervals repeating.

Differing timing diagrams 213a and 213b can result in the RNGs 232a and 232b with different states. The RNGs 232a and 232b with different states can comprise the VMs 230a and 230b with different states.

Figure 3:
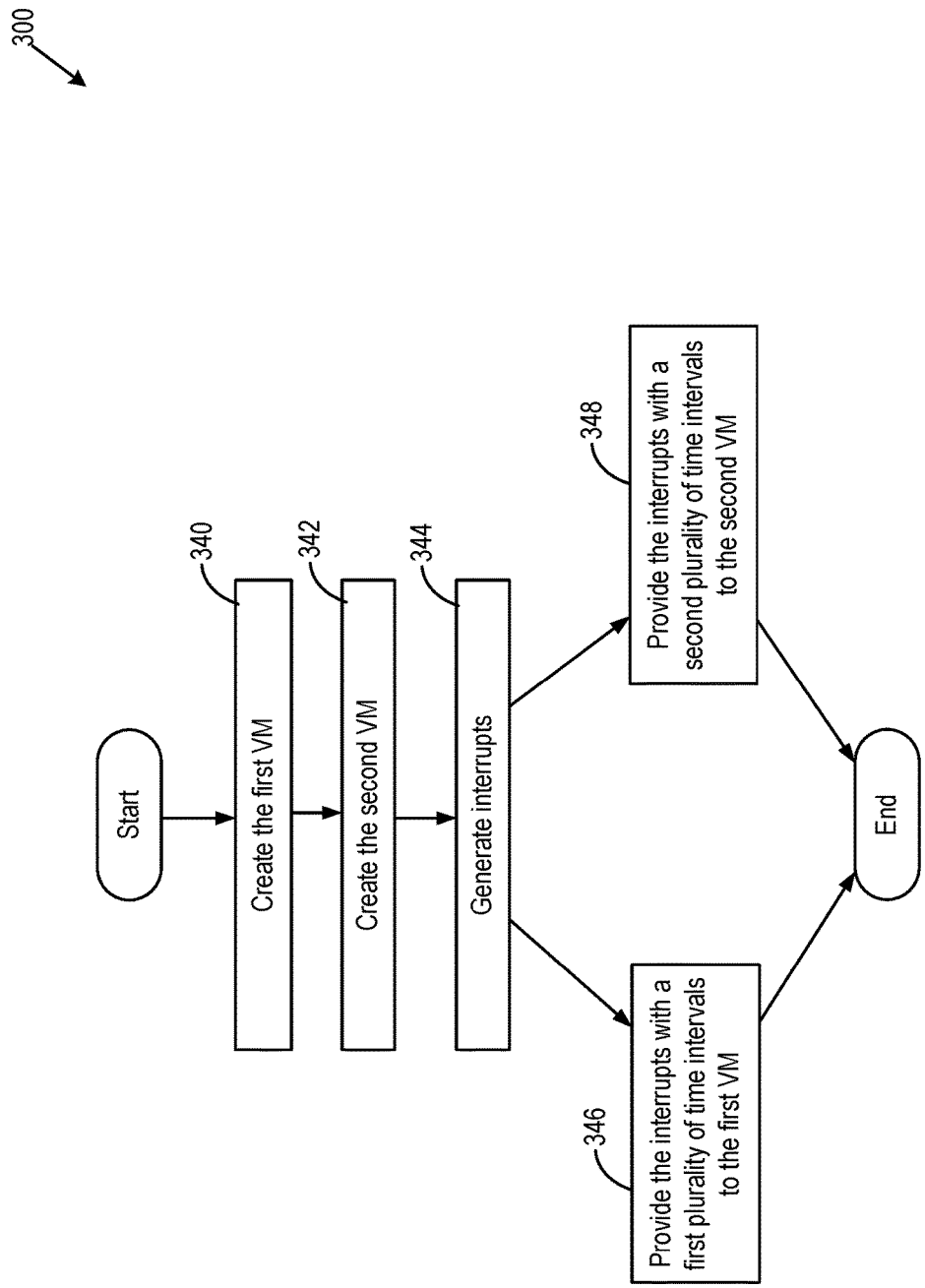
FIGS. 3, 4, and 5 illustrate examples of generating RNG states using interrupts according to various embodiments.

FIG. 3 illustrates an example of generating RNG states using interrupts according to various embodiments. A process 300 for generating RNG states may include the operations of blocks 340-348. The operations may be performed by the VMM 120 of FIG. 1.

The process 300 may start at block 340. At block 340, the process 300 may create the first VM with an RNG state. At block 342, the process 300 can create the second VM with a second RNG state. At block 344, the process 300 can generate a plurality of interrupts for the first VM and the second VM. At block 346, the process 300 can provide the plurality of interrupts to the first VM with a first plurality of time intervals between the plurality of interrupts to configure the first RNG state. At block 348, the process 300 can provide the plurality of interrupts to the second VM with a second plurality of time intervals, between the plurality of interrupts, that are different from the first plurality of time intervals to configure the second RNG state to be different from the first RNG state.

The first RNG state and the second RNG state can be a same RNG state. At block 340, the process 300 configured to create the first VM and the second VM can further be configured to configure the first VM to perform operations utilizing a random number generator after the first VM processes the plurality of interrupts having a first plurality of time intervals to configure the first RNG state.

The plurality of interrupts correspond to a device provided to at least one of the first VM and the second VM for a dedicated purpose of receiving the plurality of interrupts. That is, the plurality of interrupts can correspond to a device that does not perform operations for the first VM and/or the second VM but rather receives the interrupts and provides the interrupts to the first VM and/or the second VM.

The plurality of interrupts can also correspond to an existing virtual device provided to at least one of the first VM or the second VM to perform an operation. The existing virtual device can describe a device that performs an operation for the first VM and/or the second VM or provides a service to the first VM and/or the second VM. For example, the existing virtual device can include a storage device, network device, sound device, input device, and/or device dedicated to communication with the virtual machine monitor (VMM).

The plurality of interrupts can provide notification of network traffic that at least one of a first operating system of the first VM and a second operating system of the second VM are configured to ignore. The network traffic may not be directed to at least one of the first VM and the second VM. The plurality of interrupts can provide a status report for the existing device.

Figure 4:
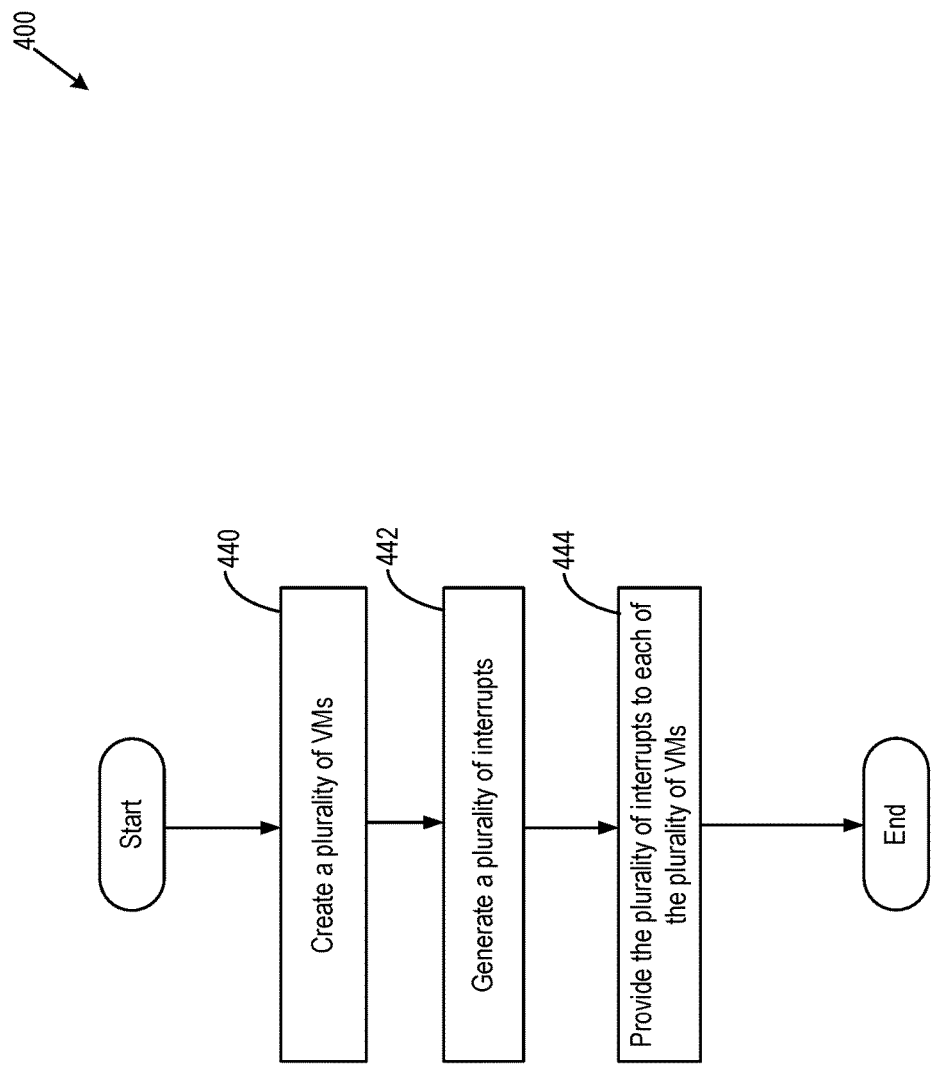

FIG. 4 illustrates an example of generating RNG states using interrupts according to various embodiments. A process 400 for generating RNG states may include the operations of blocks 440-444. The operations may be performed by the VMM 120 of FIG. 1.

The process 400 may start at block 440. At block 440, the process 400 may create a plurality of VMs with a plurality of RNG states, wherein each VM from the plurality of VMs has an RNG state from the plurality of RNG states. At block 442, the process 400 can generate a plurality of interrupts for the plurality of VMs. At block 444, the process 400 can provide the plurality of interrupts to each of the plurality of VMs to configure the plurality of RNG states to be different wherein each time the plurality of interrupts are provided to each of the plurality of VMs they are provided with a different plurality of time intervals between the plurality of interrupts.

The process 400 can also generate different pluralities of time intervals including the different plurality of time intervals. That is, the process 400 can generate a first plurality of time intervals and a second plurality of time intervals, among other plurality of time intervals. Each of the different pluralities of time intervals can be generated using an RNG unit of the computing device.

The process 400 can also generate the plurality of interrupts from an original plurality of interrupts wherein the original plurality of interrupts are less than the plurality of interrupts. For example, a second interrupt and a third interrupt can be created from a first interrupt. The content of the first interrupt can be segmented to generate the second interrupt and the third interrupt.

For example, the first interrupt can be associated with data received by the VMM for the plurality of VMs. The first interrupt can be segmented to create two or more interrupts by dividing the data into two or more segments. The second interrupt can be generated for a first segment of the data received by the VMM, and the third interrupt can be generated for a second segment of the data received by the VMM. The two or more interrupts generated from the interrupt of the original plurality of interrupts can be included in the plurality of interrupts.

Figure 5:
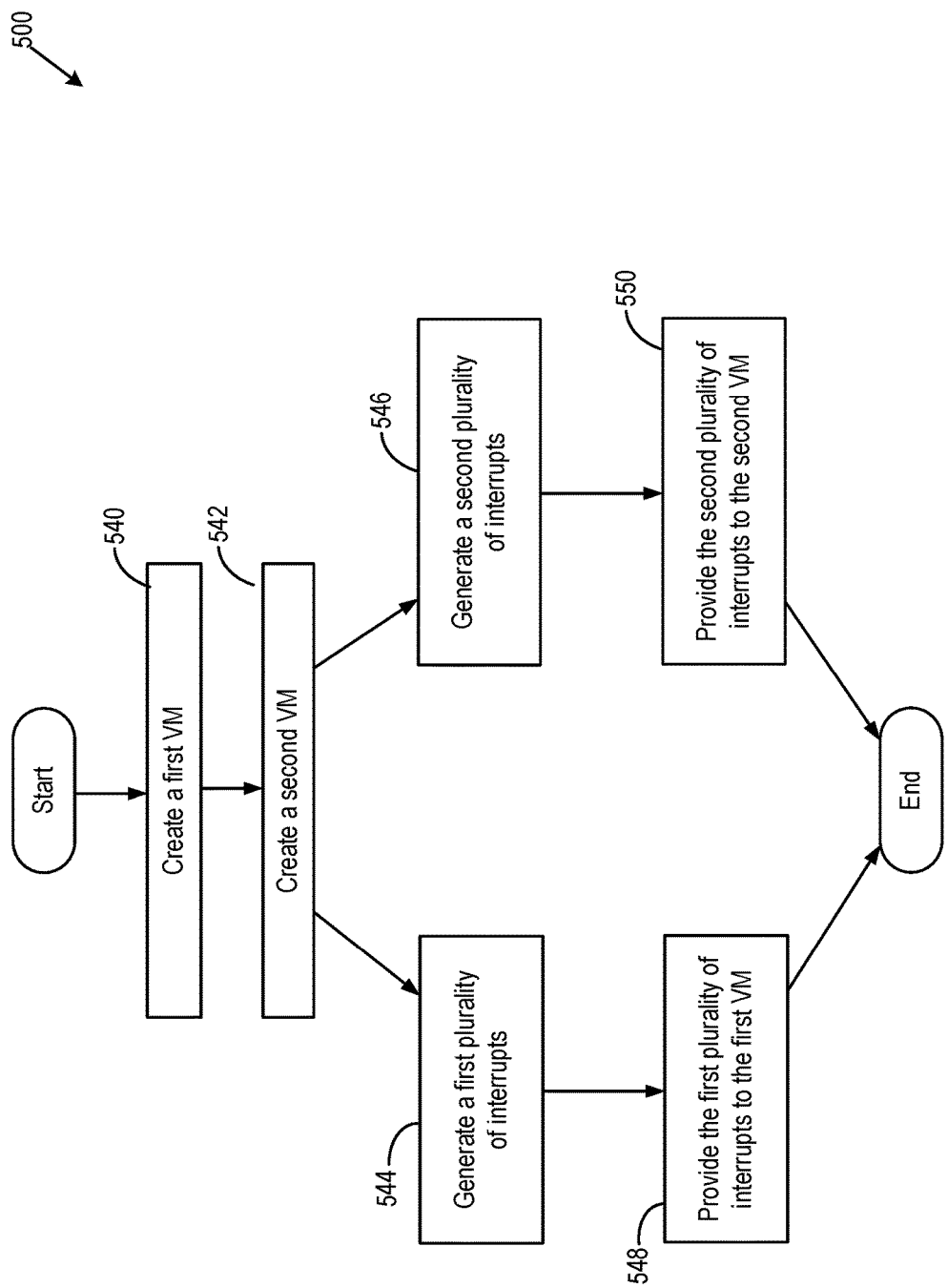

FIG. 5 illustrates an example of generating RNG states using interrupts according to various embodiments. A process 500 for generating RNG states may include the operations of blocks 540-550. The operations may be performed by the VMM 120 of FIG. 1.

At block 540, the process 500 can create the first VM with a first RNG state. At block 542, the process 500 can create the second VM with a second RNG state, wherein the first RNG state is a same state as the second RNG state. At block 544, the process 500 can generate a first plurality of interrupts for the first VM. At block 546, the process 500 can generate a second plurality of interrupts for the second VM. At block 548, the process 500 can provide the first plurality of interrupts to the first VM with a first plurality of time intervals between the plurality of interrupts to configure the first RNG state. At block 550, the process 500 can provide the second plurality of interrupts to the second VM with a second plurality of time intervals, between the second plurality of interrupts, that are different from the first plurality of time intervals to configure the second RNG state to be different from the first RNG state.

The first plurality of interrupts can be different from the second plurality of interrupts. The first plurality of interrupts can include types of interrupts different from the second plurality of interrupts. The first plurality of interrupts can comprise a first quantity of interrupts and the second plurality of interrupts can comprise a second quantity of interrupts, wherein the first quantity of interrupts is different from the second quantity of interrupts. The first plurality of interrupts and the second plurality of interrupts can be a same plurality of interrupts.

Figure 6:
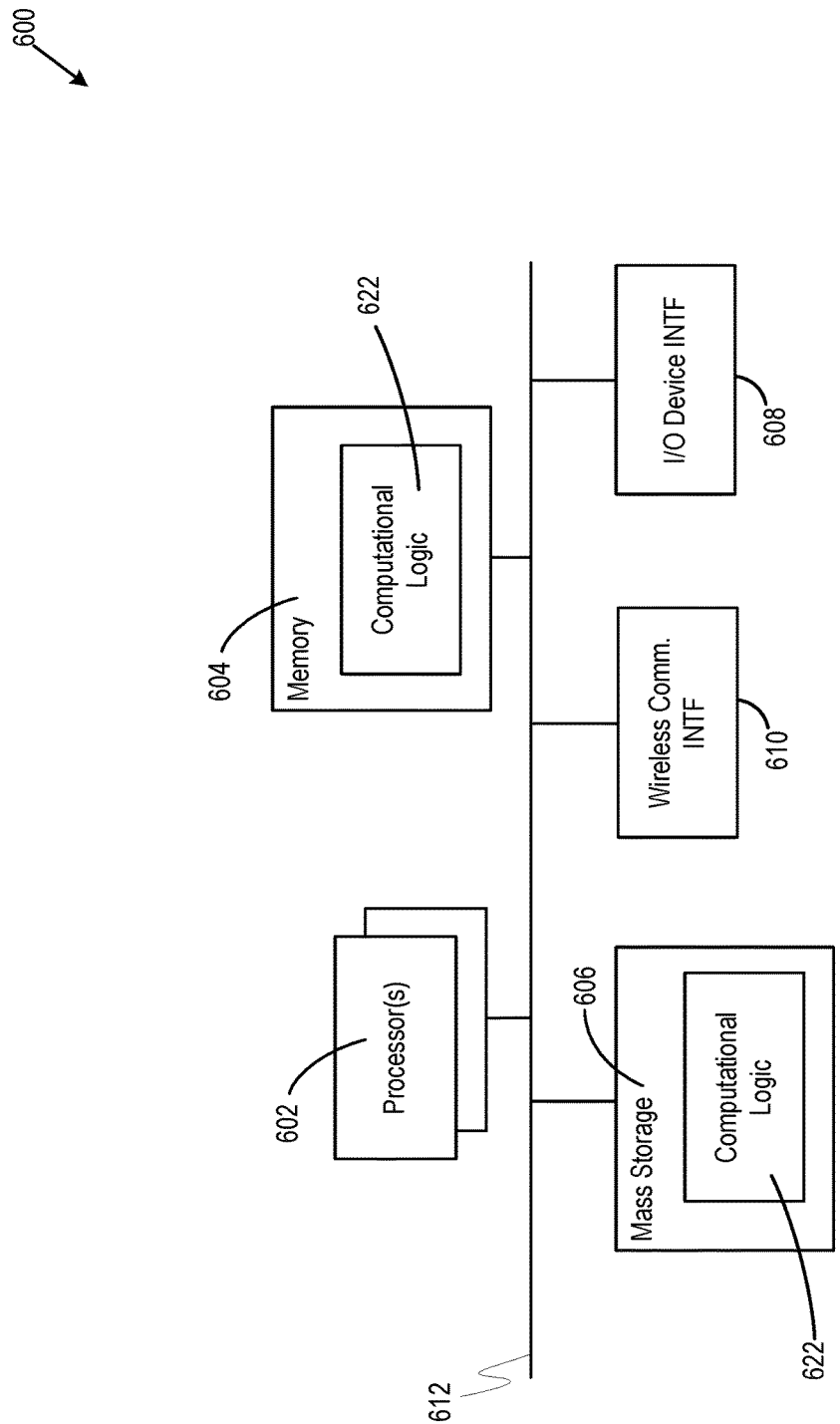
FIG. 6 illustrates an example computing device suitable for use to practice aspects of the present disclosure, according to various embodiments.

FIG. 6 illustrates an example of a computing device 600 suitable for use to practice aspects of the present disclosure, according to various embodiments. As shown, the computing device 600 may include one or more processors 602, each with one or more processor cores and system memory 604. The system memory 604 may be any volatile or non-volatile memory. Additionally, the computing device 600 may include mass storage devices 606. Example of the mass storage devices 606 may include, but are not limited to, tape drives, hard drives, compact disc read-only memory (CD-ROM) and so forth. Further, the computing device 600 may include input/output devices 608 (such as display, keyboard, cursor control and so forth) and communication interfaces 610 (such as wireless and/or wired communication/network interface cards, modems and so forth). The elements may be coupled to each other via a system bus 612, which may represent one or more buses. In the case of multiple buses, they may be bridged by one or more bus bridges (not shown).

Each of these elements may perform its conventional functions known in the art. The system memory 604 and the mass storage devices 606 may be employed to store a working copy and a permanent copy of the programming instructions implementing the operations associated with the VMM 120 of FIG. 1, including generating RNG states referred to as computational logic 622. The computational logic 622 may be implemented by assembler instructions supported by the processor(s) 602 or high-level languages, such as, for example, C, that can be compiled into such instructions.

The number, capability and/or capacity of these elements 610 and 612 may vary, depending on whether the computing device 600 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 610 and 612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
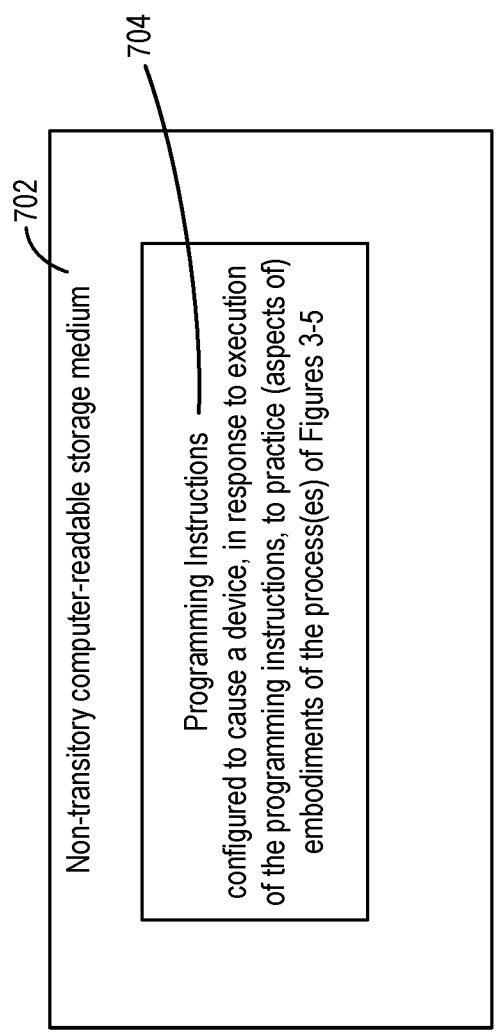
FIG. 7 illustrates a storage medium having instructions for practicing methods described with references to FIGS. 3-5, according to various embodiments.

FIG. 7 illustrates an example non-transitory computer-readable storage medium that may be suitable for use to store instructions that cause an apparatus, in response to execution of the instructions by the apparatus, to practice selected aspects of the present disclosure. As shown, a non-transitory computer-readable storage medium 702 may include a number of programming instructions 704. The programming instructions 704 may be configured to enable a device (e.g., the computing device 600 in FIG. 6) in response to execution of the programming instructions, to implement (aspects of) the VMM 120 in FIG. 1, as earlier described. In alternate embodiments, the programming instructions 704 may be disposed on the multiple non-transitory computer-readable storage media 702 instead. In still other embodiments, the programming instructions 704 may be disposed on the non-transitory computer-readable storage media 702, such as, signals.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer-readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of the processors 602 may be packaged together with memory, as earlier described. For one embodiment, at least one of the processors 602 may be packaged together with memory, to form a System in Package (SiP). For one embodiment, at least one of the processors 602 may be integrated on the same die with memory. For one embodiment, at least one of the processors 602 may be packaged together with memory, to form a System on Chip (SoC). For at least one embodiment, the SoC may be utilized in, (e.g., but not limited to, a wearable device, a smartphone or a computing tablet.)

Thus various example embodiments of the present disclosure have been described including, but are not limited to:

Example 1 is an apparatus for generating virtual machines (VMs) with different states. The apparatus includes one or more electronic memory to store a first VM and a second VM. The apparatus includes one or more processing units designed to create the first VM with a first random number generator (RNG) state and the second VM with a second RNG state, and generate a variety of interrupts for the first VM and the second VM. The apparatus includes one or more processing units designed to provide the variety of interrupts to the first VM with a first variety of time intervals between the variety of interrupts to configure the first RNG state, and provide the variety of interrupts to the second VM with a second variety of time intervals, between the variety of interrupts, that are different from the first variety of time intervals to configure the second RNG state to be different from the first RNG state.

Example 2 is the apparatus of Example 1, where the one or more processing units are further designed to create the first VM with the first RNG state and the second VM with the second RNG state, where the first RNG state and the second RNG state are a same RNG state.

Example 3 is the apparatus of Example 1, where the processing units designed to create the first VM and the second VM are further designed to design the first VM to perform operations utilizing a random number generator with the first RNG state after the first VM processes the variety of interrupts having the first variety of time intervals to configure the first RNG state.

Example 4 is the apparatus of Example 1, where the variety of interrupts correspond to a device provided to at least one of the first VM and the second VM for a dedicated purpose of receiving the variety of interrupts.

Example 5 is the apparatus of Example 1, where the variety of interrupts correspond to an existing virtual device provided to at least one of the first VM or the second VM to perform an operation.

Example 6 is the apparatus of Example 5, where the variety of interrupts provide notification of network traffic that at least one of a first operating system of the first VM and a second operating system of the second VM are designed to ignore.

Example 7 is the apparatus of Example 6, where the network traffic is not directed to at least one of the first VM and the second VM.

Example 8 is the apparatus of Example 5, where the variety of interrupts provide a status report for the existing virtual device.

Example 9 is a computer-readable storage medium having stored thereon instructions that, when implemented by a computing device, cause the computing device to create a variety of virtual machines (VMs) with a variety of random number generator (RNG) states, where each VM from the variety of VMs has an RNG state from the variety of RNG states. The computer-readable storage medium also generates a variety of interrupts for the variety of VMs, and provides the variety of interrupts to each of the variety of VMs to configure the variety of RNG states to be different, where each time the variety of interrupts are provided to each of the variety of VMs they are provided with a different variety of time intervals between the variety of interrupts.

Example 10 is the computer-readable storage medium of Example 9, further includes instructions to generate different variety of time intervals including the different variety of time intervals.

Example 11 is the computer-readable storage medium of Example 10, where each of the different variety of time intervals is generated using an RNG unit of the computing device.

Example 12 is the computer-readable storage medium of Example 9, where the instructions to generate the variety of interrupts further include instructions to generate the variety of interrupts from an original variety of interrupts where the original variety of interrupts are less than the variety of interrupts.

Example 13 is the computer-readable storage medium of Example 12, where at least an interrupt from the original variety of interrupts is associated with data received by a virtual machine monitor (VMM) for the variety of VMs.

Example 14 is the computer-readable storage medium of Example 13, where the interrupt from the original variety of interrupts is segmented to create two or more interrupts by dividing the data into two or more segments.

Example 15 is the computer-readable storage medium of Example 14, further including instructions to include the two or more interrupts generated from the interrupt of the original variety of interrupts in the variety of interrupts.

Example 16 is a method. The method includes creating a first virtual machine (VM) with a first random number generator (RNG) state and a second VM with a second RNG state, where the first RNG state is a same state as the second RNG state. The method includes generating a first variety of interrupts for the first VM and a second variety of interrupts for the second VM, and providing the first variety of interrupts to the first VM with a first variety of time intervals between the first variety of interrupts to configure the first RNG state. The method includes providing the second variety of interrupts to the second VM with a second variety of time intervals, between the second variety of interrupts, that are different from the first variety of time intervals to configure the second RNG state to be different from the first RNG state.

Example 17 is the method of Example 16, where the first variety of interrupts are different from the second variety of interrupts.

Example 18 is the method of Example 17, where the first variety of interrupts include types of interrupts different from the second variety of interrupts.

Example 19 is the method of Example 17, where the first variety of interrupts include a first quantity of interrupts and the second variety of interrupts include a second quantity of interrupts, where the first quantity of interrupts is different from the second quantity of interrupts.

Example 20 is the method of Example 16, where the first variety of interrupts and the second variety of interrupts are a same variety of interrupts.

Example 21 is a method for generating virtual machines (VMs) with different states including creating a first VM with a first random number generator (RNG) state and a second VM with a second RNG state. The method further includes generating a variety of interrupts for the first VM and the second VM, and providing the variety of interrupts to the first VM with a first variety of time intervals between the variety of interrupts to configure the first RNG state. The method further includes providing the variety of interrupts to the second VM with a second variety of time intervals, between the variety of interrupts, that are different from the first variety of time intervals to configure the second RNG state to be different from the first RNG state.

Example 22 is the method of Example 21, where the first RNG state and the second RNG state are a same RNG state.

Example 23 is the method of Example 21, where creating the first VM and the second VM further includes designing the first VM to perform operations utilizing a random number generator with the first RNG state after the first VM processes the variety of interrupts having the first variety of time intervals to configure the first RNG state.

Example 24 is the method of Example 21, where the variety of interrupts correspond to a device provided to at least one of the first VM and the second VM for a dedicated purpose of receiving the variety of interrupts.

Example 25 is the method of Example 21, where the variety of interrupts correspond to an existing virtual device provided to at least one of the first VM or the second VM to perform an operation.

Example 26 is the method of Example 25, where the variety of interrupts provide notification of network traffic that at least one of a first operating system of the first VM and a second operating system of the second VM are designed to ignore.

Example 27 is the method of Example 26, where the network traffic is not directed to at least one of the first VM and the second VM.

Example 28 is the method of Example 25, where the variety of interrupts provide a status report for the existing virtual device.

Example 29 is a method including creating a variety of virtual machines (VMs) with a variety of random number generator (RNG) states, where each VM from the variety of VMs has an RNG state from the variety of RNG states. The method includes generating a variety of interrupts for the variety of VMs, and providing the variety of interrupts to each of the variety of VMs to configure the variety of RNG states to be different, where each time the variety of interrupts are provided to each of the variety of VMs they are provided with a different variety of time intervals between the variety of interrupts.

Example 30 is the method of Example 29, further including generating different varieties of time intervals including the different variety of time intervals.

Example 31 is the method of Example 30, where each of the different varieties of time intervals is generated using an RNG unit of the computing device.

Example 32 is the method of Example 29, where generating the variety of interrupts further includes generating the variety of interrupts from an original variety of interrupts where the original variety of interrupts are less than the variety of interrupts.

Example 33 is the method of Example 32, where at least an interrupt from the original variety of interrupts is associated with data received by a virtual machine monitor (VMM) for the variety of VMs.

Example 34 is the method of Example 33, where the interrupt from the original variety of interrupts is segmented to create two or more interrupts by dividing the data into two or more segments.

Example 35 is the method of Example 34, further including the two or more interrupts generated from the interrupt of the original variety of interrupts in the variety of interrupts.

Example 36 is at least one computer-readable storage medium having stored thereon computer-readable instructions, when executed, to implement a method as exemplified in any of Examples 16-35.

Example 37 is an apparatus including a manner to perform a method as exemplified in any of Examples 16-35.

Example 38 is a manner for performing a method as exemplified in any of Examples 16-35.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for generating virtual machines (VMs) with different states:
   one or more electronic memory to store a first VM and a second VM; and
   one or more processing units configured to:
      create the first VM with a first random number generator (RNG) state and the second VM with a second RNG state;
      generate a plurality of interrupts for the first VM and the second VM;
      provide the plurality of interrupts to the first VM with a first plurality of time intervals between the plurality of interrupts to configure the first RNG state; and
      provide the plurality of interrupts to the second VM with a second plurality of time intervals, between the plurality of interrupts, that are different from the first plurality of time intervals to configure the second RNG state to be different from the first RNG state.

2. The apparatus of claim 1, wherein the one or more processing units are further configured to create the first VM with the first RNG state and the second VM with the second RNG state, wherein the first RNG state and the second RNG state are a same RNG state.

3. The apparatus of claim 1, wherein the processing units configured to create the first VM and the second VM are further configured to configure the first VM to perform operations utilizing a random number generator with the first RNG state after the first VM processes the plurality of interrupts having the first plurality of time intervals to configure the first RNG state.

4. The apparatus of claim 1, where the plurality of interrupts correspond to a device provided to at least one of the first VM and the second VM for a dedicated purpose of receiving the plurality of interrupts.

5. The apparatus of claim 1, wherein the plurality of interrupts correspond to an existing virtual device provided to at least one of the first VM or the second VM to perform an operation.

6. The apparatus of claim 5, wherein the plurality of interrupts provide notification of network traffic that at least one of a first operating system of the first VM and a second operating system of the second VM are configured to ignore.

7. The apparatus of claim 6, wherein the network traffic is not directed to at least one of the first VM and the second VM.

8. The apparatus of claim 5, wherein the plurality of interrupts provide a status report for the existing virtual device.

9. A non-transitory computer-readable storage medium comprising a physical memory device having stored thereon instructions that, when implemented by a computing device, cause the computing device to:
   create a plurality of virtual machines (VMs) with a plurality of random number generator (RNG) states, wherein each VM from the plurality of VMs has an RNG state from the plurality of RNG states;
   generate a plurality of interrupts for the plurality of VMs; and
   provide the plurality of interrupts to each of the plurality of VMs to configure the plurality of RNG states to be different, wherein each time the plurality of interrupts are provided to each of the plurality of VMs they are provided with a different plurality of time intervals between the plurality of interrupts.

10. The non-transitory computer-readable storage medium of claim 9, further comprising instructions to generate different pluralities of time intervals including the different plurality of time intervals.

11. The non-transitory computer-readable storage medium of claim 10, wherein each of the different pluralities of time intervals is generated using an RNG unit of the computing device.

12. The non-transitory computer-readable storage medium of claim 9, wherein the instructions to generate the plurality of interrupts further comprise instructions to generate the plurality of interrupts from an original plurality of interrupts wherein the original plurality of interrupts are less than the plurality of interrupts.

13. The non-transitory computer-readable storage medium of claim 12, wherein at least an interrupt from the original plurality of interrupts is associated with data received by a virtual machine monitor (VMM) for the plurality of VMs.

14. The non-transitory computer-readable storage medium of claim 13, wherein the interrupt from the original plurality of interrupts is segmented to create two or more interrupts by dividing the data into two or more segments.

15. The non-transitory computer-readable storage medium of claim 14, further comprising instructions to include the two or more interrupts generated from the interrupt of the original plurality of interrupts in the plurality of interrupts.

16. A method, comprising:
creating a first virtual machine (VM) with a first random number generator (RNG) state and a second VM with a second RNG state, wherein the first RNG state is a same state as the second RNG state;
generating a first plurality of interrupts for the first VM and a second plurality of interrupts for the second VM;
providing the first plurality of interrupts to the first VM with a first plurality of time intervals between the first plurality of interrupts to configure the first RNG state; and
providing the second plurality of interrupts to the second VM with a second plurality of time intervals, between the second plurality of interrupts, that are different from the first plurality of time intervals to configure the second RNG state to be different from the first RNG state.

17. The method of claim 16, wherein the first plurality of interrupts are different from the second plurality of interrupts.

18. The method of claim 17, wherein the first plurality of interrupts include types of interrupts different from the second plurality of interrupts.

19. The method of claim 17, wherein the first plurality of interrupts comprise a first quantity of interrupts and the second plurality of interrupts comprise a second quantity of interrupts, wherein the first quantity of interrupts is different from the second quantity of interrupts.

20. The method of claim 16, wherein the first plurality of interrupts and the second plurality of interrupts are a same plurality of interrupts.

* * * * *